United States Patent [19]

Rowan, Jr.

[11] Patent Number: 5,163,775

[45] Date of Patent: Nov. 17, 1992

[54] ANCHOR BOLT REPAIR COUPLING

[76] Inventor: Robert L. Rowan, Jr., 3239 Ella Lee La., Houston, Tex. 77019

[21] Appl. No.: 605,241

[22] Filed: Oct. 29, 1990

[51] Int. Cl.$^5$ .............................................. F16B 7/04
[52] U.S. Cl. .................................. 403/301; 403/314; 403/362; 403/369
[58] Field of Search ............... 403/301, 305, 306, 308, 403/310, 313, 314, 362, 369-371, 16, 300, 309; 411/267, 268, 266, 265, 433; 52/726, 223 L, 707, 704

[56] References Cited

U.S. PATENT DOCUMENTS

| | | | |
|---|---|---|---|
| 1,177,869 | 4/1916 | Kelley | 403/301 X |
| 1,429,263 | 9/1922 | Wolfe | 403/301 X |
| 2,233,794 | 3/1941 | Noble | 403/369 |
| 3,085,306 | 4/1963 | Drysdale | 403/369 X |
| 3,743,333 | 7/1973 | Kosinski | 403/362 |
| 4,362,421 | 12/1982 | Kelly | 403/369 |
| 4,388,014 | 6/1983 | Wlodkowski et al. | 403/369 |

FOREIGN PATENT DOCUMENTS 1209891 10/1970 United Kingdom ............... 403/301

OTHER PUBLICATIONS

"How to Repair a Broken Anchor Bolt," Data Sheet #200, Sep. 1988, Robt. L. Rowan & Assoc., Inc.
"Anchor Bolts," Grouting Technology Newsletter, 1987, Robt. L. Rowan & Assoc., Inc.

Primary Examiner—Peter M. Cuomo
Attorney, Agent, or Firm—Fish & Richardson

[57] ABSTRACT

An improved device for repairing failed anchor members that hold machinery to foundations. An anchor bolt repair coupling that engages a failed anchor member through the use of grips and facilitates the repair of the failed member.

11 Claims, 3 Drawing Sheets

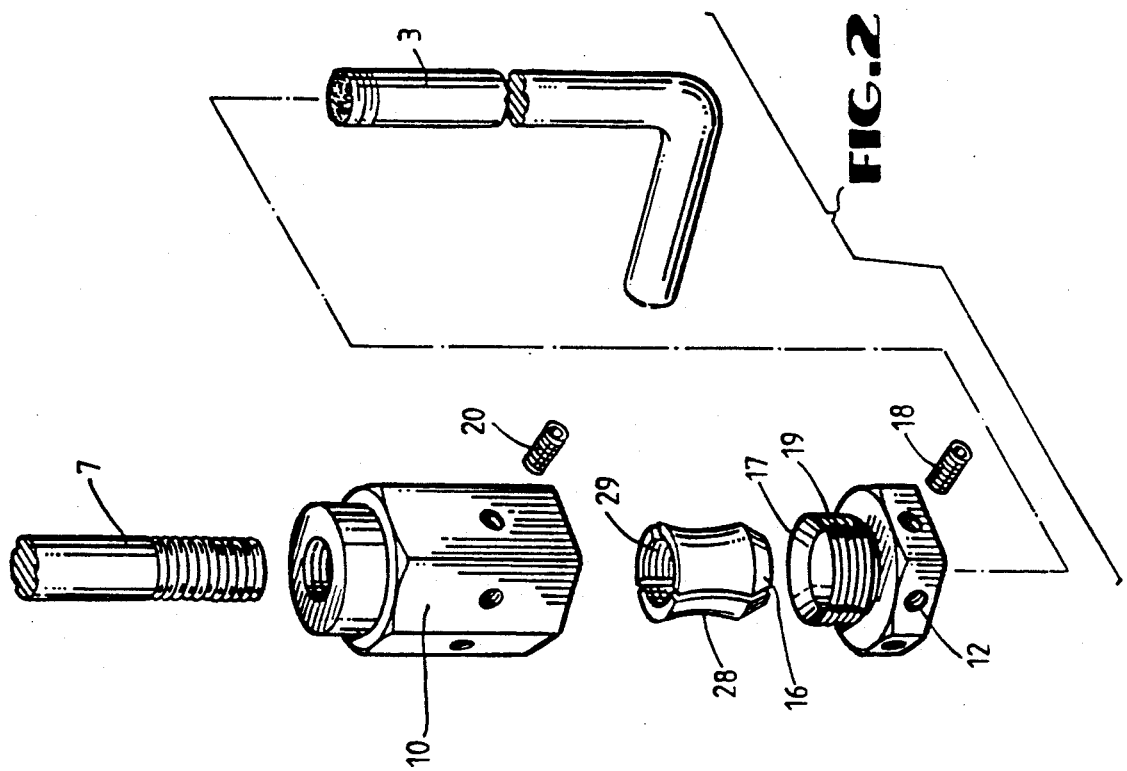
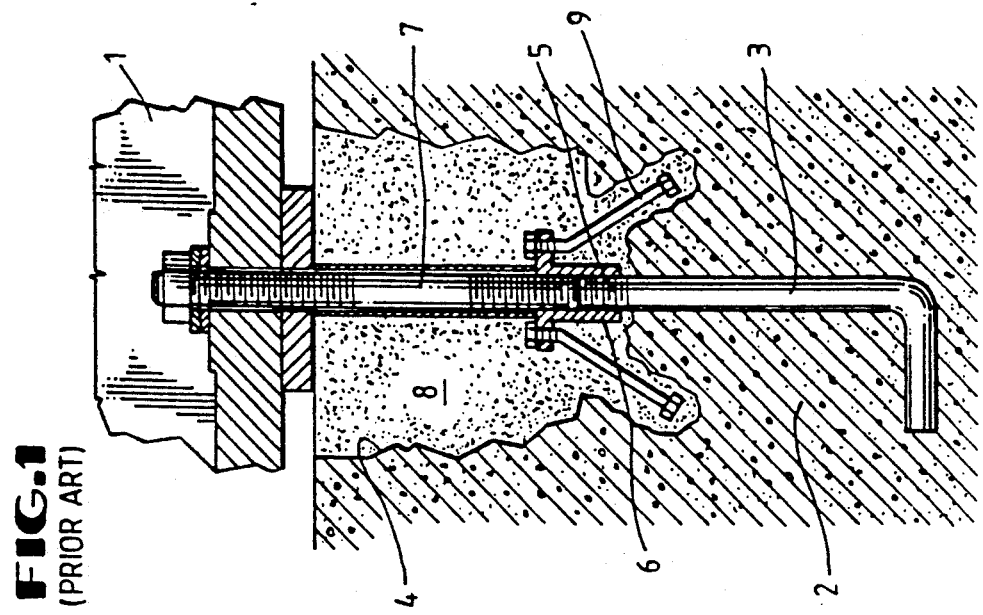

ANCHOR BOLT REPAIR COUPLING

BACKGROUND OF THE INVENTION

1. Field of the Invention

The present invention relates generally to an improved device for repairing broken anchoring members, and more specifically relates to an improved coupling for repairing broken anchor bolts for holding stationary machinery in place.

2. Description of the Related Art

It is common in the industry to anchor stationary machinery such as pumps, compressors, reciprocating engines, and the like to a foundation using anchoring bolts. Typically, the bolts or studs are set in the foundation and have threaded portions that extend above the foundation and facilitate anchoring of the stationary machinery thereto. However, as those skilled in the art will appreciate, a threaded anchor bolt is a complex piece of machinery in its own right and is subject to a number of complex failure modes.

Bolted fasteners, such as threaded anchor bolts, are prone to failure from overtorquing, undertorquing, fatigue loading, impact loading, ductile overloading, corrosion, metallurgical abnormalities, and loss of preload, to name just a few. Thus, it is often necessary to repair anchor bolts that have failed in service.

Several methods and devices have been developed for repairing broken anchor bolts. Among the prior art solutions, welding has been the least successful. Typically, to weld repair an anchor member, the foundation must first be chipped away from the area adjacent the fracture surface of the anchor member. The fracture surface is then usually ground flat or completely removed by saw cutting. Next, a new section of anchor member, e.g., threaded stud, is welded to the still-embedded failed anchor member. Weld repairing of failed anchor members has been successful in those few cases where the anchor member material is readily weldable, and where the strength requirements of the anchor member are minimal. Weld repairing will typically not be successful on high strength anchor members such as those fabricated from the low alloy 4100 and 4300 series steels, or from high alloy steels. Also, as will be recognized by those skilled in the art, welding produces many microvoids that can serve as fracture initiation sights and lead to the premature failure of the repaired anchor member.

Another prior art method of repairing failed anchor members is that of field threading. To repair a failed anchor member by field threading, the foundation surrounding the failed member must be chipped away to allow a sufficient work space in which to cut threads on the failed member. Typically the chipped-out hole should be at least ten to twelve times the anchor member diameter in depth. The fractured anchor member is then cut off two to three inches above the bottom of the chipped out hole. A thread cutting die or similar tool is then used to cut threads onto the failed anchor member. Once the threads have been cut on the fractured anchor member, a coupling nut can be threaded onto the member. Thereafter, a new section of anchor member is screwed into the top of the coupling and extends above the foundation base. After aligning the new section of anchoring member, the chipped out hole is typically filled with epoxy or other suitable grout. The prior art practice of field thread repairing a failed anchor member is time consuming, difficult and prone to failure.

Thus, there is a need in the industry, appreciate by those skilled in the art, for a new way of repairing broken anchor bolt members.

The present invention is directed to providing an improved device for repairing broken anchor members which does not require the time consuming, difficult and failure prone practices of weld repairing or field thread repairing. Accordingly, the present invention provides a new anchor bolt repair coupling that overcomes the deficiencies of the prior art.

SUMMARY OF THE INVENTION

In one aspect of the present invention, a repair coupling is provided having a base with an internal chamber open at one end and a threaded portion at the other end for receiving a threaded member. Grips are located in the internal chamber for gripping an anchor member and means for engaging the grips against the anchor member are provided.

In another embodiment, the engaging means are threaded fasteners which contact the grips substantially parallel to the longitudinal axis of the anchor member.

In a further embodiment, the grips are curved about an axis parallel to a longitudinal axis of the anchoring member.

A still further embodiment of the present invention provides a longitudinal notch in the grips for fracturing the grips into several smaller grips.

Still another embodiment of the present invention is where the engaging means are threaded fasteners which contact the grips substantially perpendicular to the longitudinal axis of the anchor member.

In another embodiment of the present invention, the internal chamber of the coupling base is tapered with respect to the longitudinal axis of the anchor member such that as the grips are moved relatively downward in the chamber, the grips are forced into stronger gripping engagement with the anchor member.

In a still further embodiment of the present invention, a threaded cap is provided for positioning the grips on the anchor member.

A still further embodiment of the present invention provides a spacing means for locating the grips within the internal chamber.

In another embodiment of the present invention, a repair coupling is provided which comprises a coupling base having a tapered internal chamber opened at one end and having a threaded receptacle at the other end for receiving a threaded first anchor member. Grips are located in the chamber for gripping a second anchor member. Spacing means for locating the grips are also provided within the chamber. Engaging means are provided that force the grips against the second anchor member.

A still further embodiment provides a method for repairing a failed anchor member by removing foundation surrounding the failed member, removing all but a short stub of the exposed anchor member, engaging grips in a repair coupling against the failed member, attaching a replacement anchor member to the repair coupling and filling the repair region with foundation repair material.

BRIEF DESCRIPTION OF THE DRAWINGS

FIG. 1 shows a prior art solution for repairing failed anchor bolts.

FIG. 2 shows an exploded view of a two-piece anchor bolt repair coupling according to the present invention.

DETAILED DESCRIPTION OF A PREFERRED EMBODIMENT

Figure 3:
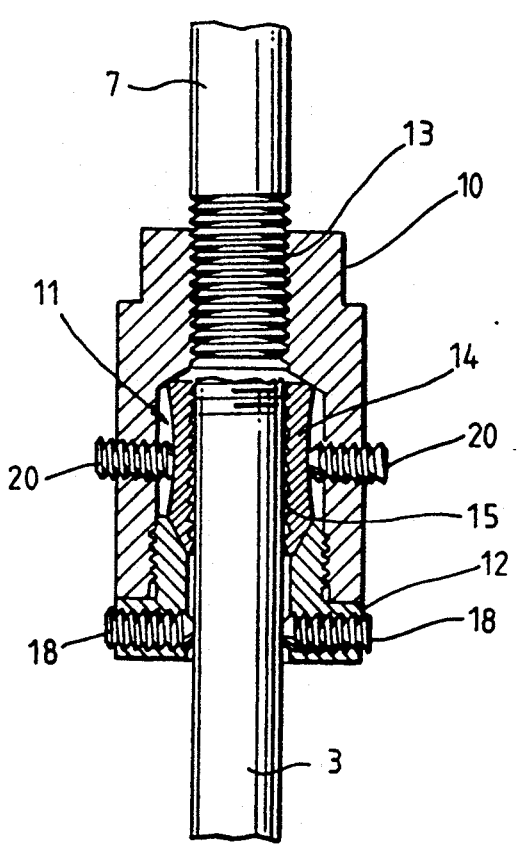
FIG. 3 shows a longitudinal cross-sectional view of a failed anchor bolt repaired with the two-piece coupling of FIG. 2.

FIG. 1 is an illustration of one of the more successful prior art solutions for repairing a failed anchor member used to hold stationary machinery to a foundation. As can be seen from FIG. 1, stationary machinery 1 is anchored to an existing foundation 2 by an original anchor bolt 3. At a point in time prior to the failure of anchor bolt 3, the anchor bolt 3 extended above the foundation and facilitated the anchoring of the machinery 1 thereto. At some time during the service life of the anchor bolt 3, a failure, such as a fatigue fracture, occurred and compromised the integrity of the anchor system. It then became necessary to repair the fractured anchor member 3. The prior art solution illustrated in FIG. 1 required that foundation 2 be chipped out around the fractured bolt, leaving a chipped-out region 4. The chipped-out region was typically 10 to 12 times the anchor member diameter in depth. The failed anchor member 3 was then saw cut approximately 3 to 4 inches above the bottom of the chipped out region 4. The 3 to 4 inches of exposed, failed anchoring member were then threaded using a thread cutting die. This threaded portion 5 is indicated in FIG. 1. An internally threaded coupling 6 was then screwed onto the cut threads 5 on the original anchor member 3 for a distance sufficient to develop full strength of the threaded joint. A replacement anchor member 7 was then threaded into the opposite end of the coupling 6 for a distance sufficient to develop the full strength of the threaded joint. The chipped out region was then filled with repair epoxy 8 or a similar grouting medium. The replacement anchor member 7 was then positioned for proper alignment with the machinery 1.

If the failure mode of the original anchor member 3 was due to insufficient strength of the original anchor member 3, the prior art repair may have included secondary anchoring members 9 emanating from the coupling 6 for additional strength.

The present invention overcomes the many disadvantages enumerated above of the prior art. FIG. 2 and FIG. 3 show a two-piece embodiment of the present invention. The anchor bolt repair coupling consists of a substantially cylindrical body 10. In FIG. 2, the body 10 is shown to have been fabricated from hexagonal stock. The body 10 has an internal grip chamber 11 into which the failed anchor member 3 extends. The body 10 also consists of a cap 12. The cap can be joined to the bottom of the body 10 by conventional means of fastening such as threading. At the end of the body opposite the cap, the body 10 has threads for receiving the replacement anchor member 7. The anchor bolt repair coupling of FIGS. 2 and 3 also consists of a set of grips 14. The grip set shown in FIGS. 2 and 3 consist of three individual grips in total. Each grip is curved about a longitudinal axis and forms basically one-third of a circle. Each grip is also curved about an axis passing through its mid-length and substantially perpendicular to the longitudinal axis. The curvature about the perpendicular axis is only exhibited on the outside surface 28 of the grip. The inside diameter 29 of each grip 14 has serrated edges or teeth 15 for gripping the failed anchor member 3. While FIGS. 2 and 3 reveal serrations or teeth for gripping, those skilled in the art will appreciate that any roughened surface capable of forcefully engaging the failed anchor member will suffice. Each grip also has a chamfered area 16 at one end of the grip for engaging a corresponding chamfered area 17 on the cap 12.

In practice, the foundation 2 surrounding the failed anchor member 3 is chipped out sufficient to provide clearance to install the anchor bolt repair coupling shown in FIGS. 2 and 3. The failed anchor member 3 is then saw cut or torch cut approximately 3 to 4 inches from the bottom of the chipped-out region 4. The cap 12 is then placed around the failed anchor member 3 as shown in FIG. 3. Set screws 18 are then threaded into the cap for fixedly engaging the cap 12 against the fractured anchor member 3. Next, the grips 14 are placed around the extending portion of the failed anchor member 3 such that the chamfered region 16 on grips 14 mates with the chamfered region 17 of the cap 12. A rubber band or other similar spacing means such as tape can be used to hold the grips 14 against the fractured anchor member 3 during the repair procedure. Once the grips 14 are in place, the body 10 is then screwed onto the cap threads 19. Once the body 10 has been screwed onto cap 12, engaging means 20, here, set screws, are threaded through the body 10 to engage the outer curved diameter surface of grips 14. The engaging means 20 are used to forcefully engage the grips 14 against the failed anchor member 3. Once the engaging means 20 have been set and the grips 14 are forcefully engaged against the failed anchor member 3, the replacement anchor member 7 may be threaded into the upper end of the body 10 at threads 13. It will be appreciated by those skilled in the art that engaging means 20 can also be used to align replacement anchor member 7.

Alternatively, the cap 12 can be loosely attached to the body 10 prior to positioning on the failed anchor member 3. The grips 14 are first placed inside the chamber 11 and may be held in position by a suitable spacing means (not shown) such as foam strips or a foam plug. The cap 12 is then loosely attached to the body 10 by cap threads 19. The combined cap/body/grip assembly is then positioned on the failed anchor member 3 such that the anchor member 3 passes through the cap 12 and into the internal chamber 11 where it is contacted by the grips 14. The cap 12 is securely fastened to the body 10 by tightening against the cap threads 19. This tightening causes the chamfered area 16 on the grips to engage the chamfered area 17 on the cap 12 and forces the grips against the failed anchor member 3. The cap set screws 18 facilitate the tightening by the use of a pry bar or the like. Once the cap/body has been securely fastened together, the engaging means 20 can be set to forcefully engage the grips against the failed member 3. Next, the cap set screws 18 can be engaged against the failed member 3. The replacement anchor member 7 is then threaded into threads 13 and the chipped-out region 4 filled with suitable material after the replacement member 7 has been aligned.

Figure 4:
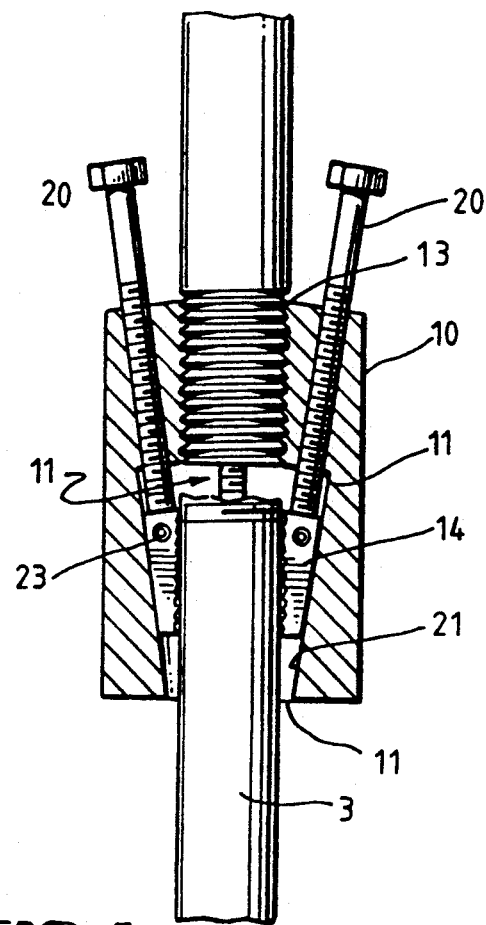
FIG. 4 shows a longitudinal cross-sectional view of a one-piece anchor bolt repair coupling according to the present invention.
Figure 5:
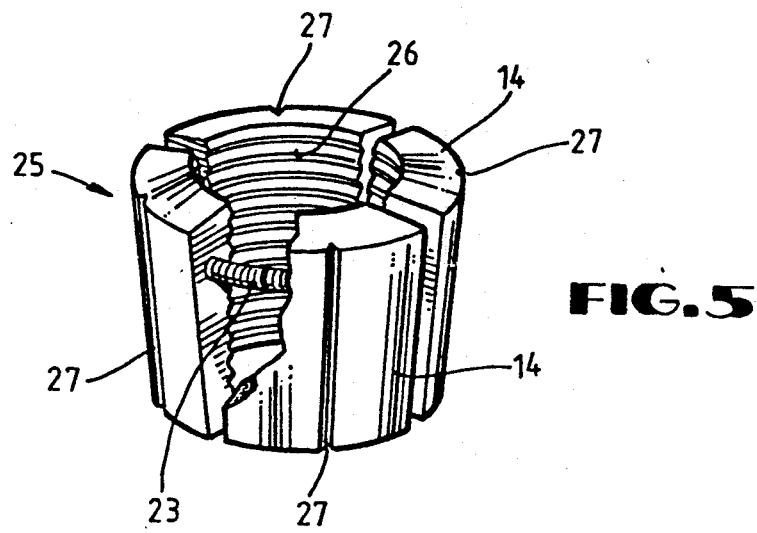
FIG. 5 shows a set of grips used with the repair coupling of FIG. 4.

FIGS. 4 and 5 describe the preferred embodiment of the invention. FIGS. 4 and 5 show an anchor bolt repair coupling body 10 of substantially cylindrical cross-section, a failed anchor member 3, grips 14, engaging means 20, and replacement anchor member 7. The coupling body 10 is seen to have an internal grip chamber 11 which has a greater diameter toward the top of the chamber 11a as opposed to the diameter at the bottom of the chamber 11b. In other words, the internal chamber is tapered from top to bottom. A grip set 25 as shown in FIG. 5 is composed in the preferred embodiment of four individual grips 14 which comprise basically one-quarter of a circle each. The inside diameter surface of the grips are serrated or teethed 26 for forcefully engaging the failed anchor member 3. The outside diameter surface 27 of the grip is tapered corresponding to the taper of the internal chamber 11 as shown in FIG. 4. The grip set 25 also includes a spacing means 23, in this case a girder spring, for holding the grip set in position during repair. Foam strips or inserts are also suitable spacing means for positioning and locating the grips.

In practice, the grip set 25 is loaded into the internal grip chamber such that tapered surface 27 mates with tapered surface 21 of the repair coupling body 10. The coupling body 10 with grip set 25 is then lowered onto the failed anchor member 3. Engaging means 20 are then activated, in this case screwed, against the top surface of each individual grip 14, thereby forcing each individual grip lower and lower into the internal passageway which, because of the internal tapered surface 21, causes an increasing gripping force to be exerted by the grips against the failed anchor member 3. While the engaging means 20 are substantially parallel to the longitudinal axis of the failed member 3, they are canted at an acute angle to the longitudinal axis to facilitate their activation. Once the grips have been forced into position by engaging means 20, the replacement anchor member 7 may be threaded into threads 13 in the top of the coupling body 10. Those skilled in the art will recognize the utility of using rolled threads for all threaded connections in order to achieve maximum service life, and will again appreciate that engaging means 20 may also be used to align replacement anchor member 7. It will also be appreciated that secondary anchoring members 9 may be used with the present invention to increase the strength of the repaired anchor member.

The engaging means 20 is disclosed to be individual threaded members that contact the grips 14. The engaging means 20 can also be a cylindrical ring (not shown) that engages the top of each grip concurrently and is activated (i.e., forced downward against the grips) by a threaded member or other suitable device such as a hydraulic or pneumatic actuator.

Referring specifically to FIG. 5, the preferred embodiment of the grip set 25 includes grips 14 with a notch 22 that describes a predetermined fracture path. Typically, the notch 22 will take the form of a V-notch or other type of stress concentration area running the longitudinal length of the mid-width of the grip 14. When the grip set is used on a failed anchor member 3 of relatively small diameter the force applied by the engaging means 20 can cause each individual grip 14 to fracture or deform along the notch 22, thus creating in effect multiple the original number of grips. Preferably, the grips are fabricated from alloy steel and heat treated to a hardness level greater than that of the failed anchor member. In most cases this requires a Rockwell hardness greater than 35 HRC. The grips may alternatively be cast and include surface hardening treatments. The present invention may also be used with grips that are as hard or softer than the failed anchor member.

Figure 6:
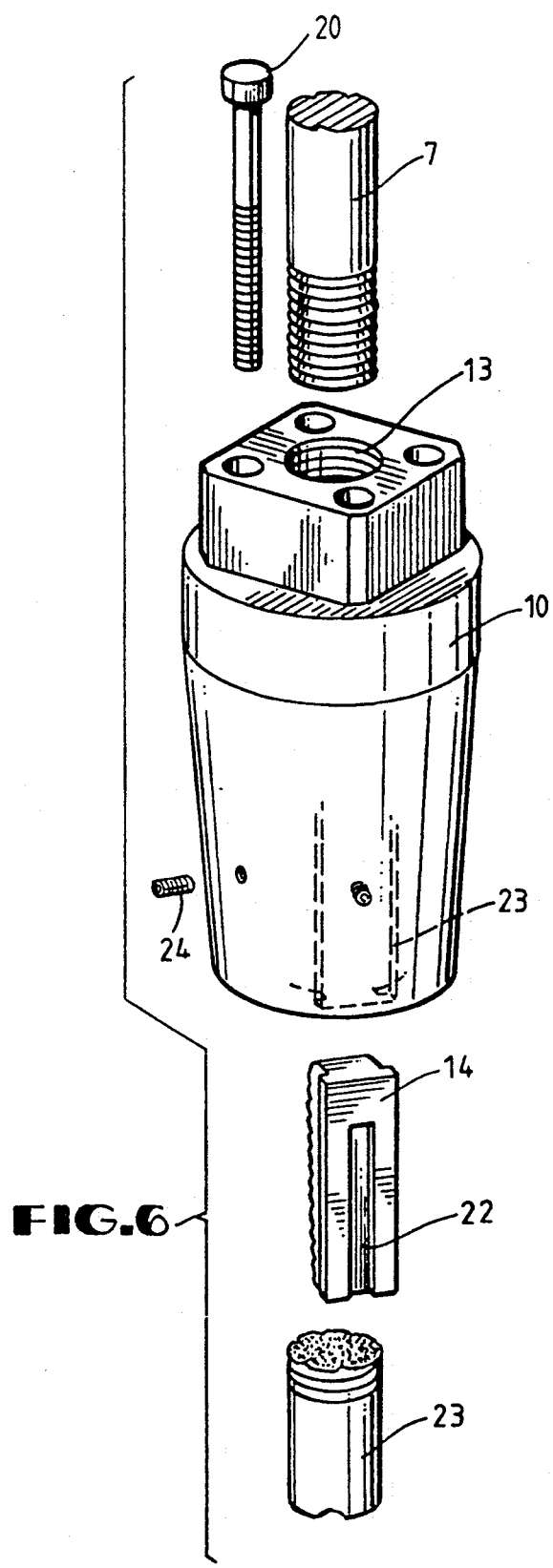
FIG. 6 shows an exploded view of an alternate one-piece anchor bolt repair coupling according to the present invention.
Figure 7:
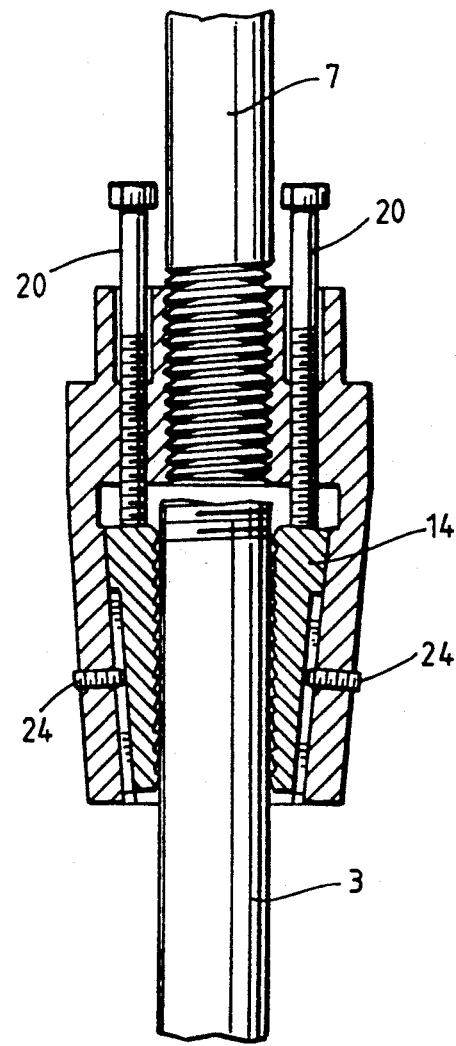
FIG. 7 shows a longitudinal cross-sectional view of the repair coupling shown in FIG. 6.

FIGS. 6 and 7 show various modifications to the preferred embodiment shown in FIGS. 4 and 5. As can be seen from FIGS. 6 and 7, the engaging means 20 are aligned substantially parallel to the anchor member axis. The spacing means 23 in FIG. 6 is shown to be individual T-slots for each individual grip 14. Moreover, the notch 22 in each grip 14 does not extend all the way from the bottom of the grip to the top of the grip on the outside surface. This discontinuous notch allows the use of pins 24 in the T-slot to prevent the grip 14 from falling out of the coupling body member 10 during the repair procedure.

Numerous modifications and variations of the present invention are possible in light of the above disclosure. It is therefore to be understood that within the scope of the appended claims, the invention may be practiced otherwise than as specifically described herein:

What is claimed is:

1. A repair coupling for repairing a broken anchor bolt, which comprises:
   a coupling base having a tapered internal wall defining a chamber open at one end, and having a threaded portion at the other end for receiving a threaded member;
   a plurality of grips each having a serrated face for gripping the broken anchor bolt and a substantially smooth face opposite the serrated face for contacting the tapered internal wall of the coupling base; said grips positioned in the chamber such that a passage is formed for receiving the broken anchor bolt, and;
   preloading means extending into said coupling base for forcibly engaging the grips against the broken anchor bolt such that said coupling and said anchor bolt are preloadable to a level greater than or equal to an anticipated maximum load level of the anchor bolt in a repaired condition.

2. The apparatus of claim 1 wherein the preloading means are threaded fasteners which engage the grips substantially parallel to the longitudinal axis of the anchor bolt.

3. The apparatus of claim 1 wherein the grips are curved about an axis parallel to a longitudinal axis of the anchoring bolt.

4. The apparatus of claim 1 wherein the grips have a longitudinal notch for fracturing into several smaller grips.

5. The apparatus according to claim 1 wherein the preloading means are threaded fasteners which engage the grips substantially perpendicular to the longitudinal axis of the anchor bolt.

6. The apparatus of claim 5 further comprising a threaded cap for positioning the grips in the chamber and on the anchor bolt.

7. The apparatus of claim 1 further comprising a spacing means for positioning the grips within the chamber and against the wall such that the serrated face of the grips faces a centerline of the coupling.

8. A repair coupling for repairing broken anchor bolts, which comprises:
   a coupling base having a tapered internal wall defining a chamber open at one end, and having a threaded receptacle at the other end for receiving a threaded anchor member;

a plurality of grips each having a serrate face for gripping the broken anchor bolt and a substantially smooth face opposite the serrated face for contacting the tapered internal wall of the coupling base; said grips positioned in the chamber such that a substantially cylindrical passage is formed for receiving the broken anchor bolt;

spacing means for positioning the grips within the chamber and against the wall such that the serrated faces of the grips face a centerline of the coupling, and;

preloading means extending into said coupling base for forcibly engaging the grips against the broken anchor bolt such that said coupling and said anchor bolt are preloadable to a level greater than or equal to an anticipated maximum load level of the anchor bolt in a repaired condition.

9. The apparatus of claim 8 wherein the preloading means are threaded fasteners which engage the grips substantially parallel to the longitudinal axis of the anchor bolt.

10. The apparatus of claim 9 wherein the spacing means is a spring.

11. A method for producing a repaired anchor bolt comprising the steps of:

removing foundation surrounding a failed anchor bolt to produce a repair region of sufficient depth to expose the failed anchor bolt;

removing all but a short stub of the failed anchor bolt;

installing upon the failed anchor bolt a repair coupling assembly comprising a coupling base having a tapered internal wall defining a chamber open at one end and having a threaded portion at the other end for receiving a threaded replacement anchor member, a plurality of grips each having a serrated face for gripping the failed anchor bolt and a substantially smooth face opposite the serrated face for contacting the tapered internal wall of the coupling base, said grips positioned in the chamber such that a passage is formed for receiving the broken anchor bolt, and preloading means extending into said coupling base for forcibly engaging the grips against the broken anchor bolt;

activating the preloading means to engage the grips against the failed anchor bolt and to preload said coupling assembly and said anchor bolt to a level greater than or equal to an anticipated maximum load level of the bolt in a repaired condition;

attaching the threaded replacement anchor member to the threaded portion of the coupling base; and filling in the repair region with foundation repair material such that a portion of the replacement anchor member extends above the repaired foundation.

* * * * *